Nov. 7, 1967     D. C. HANNA     3,350,733
CAR WASHING DEVICES
Filed Aug. 5, 1966     4 Sheets-Sheet 1
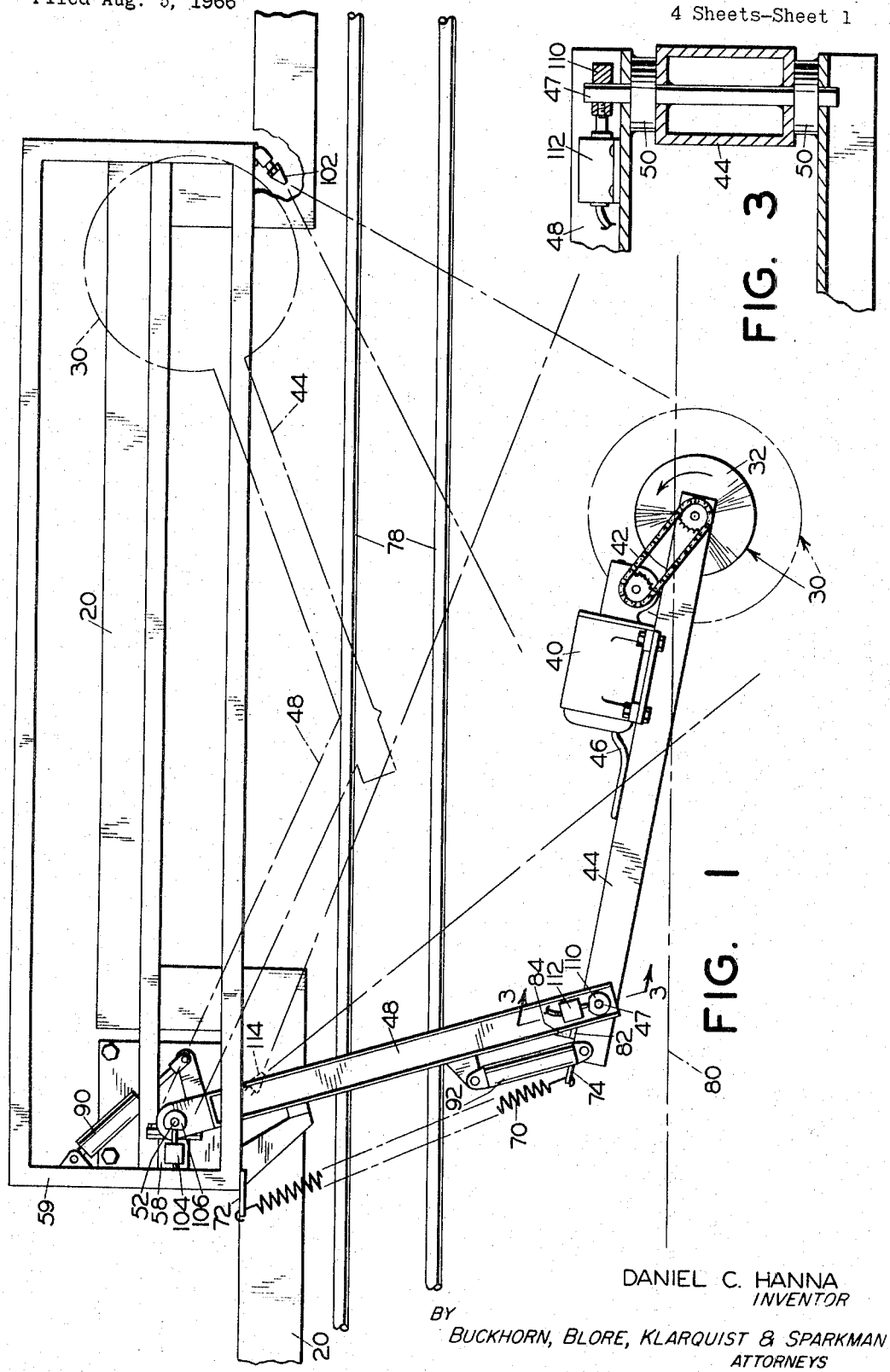
DANIEL C. HANNA
INVENTOR
BY
BUCKHORN, BLORE, KLARQUIST & SPARKMAN
ATTORNEYS

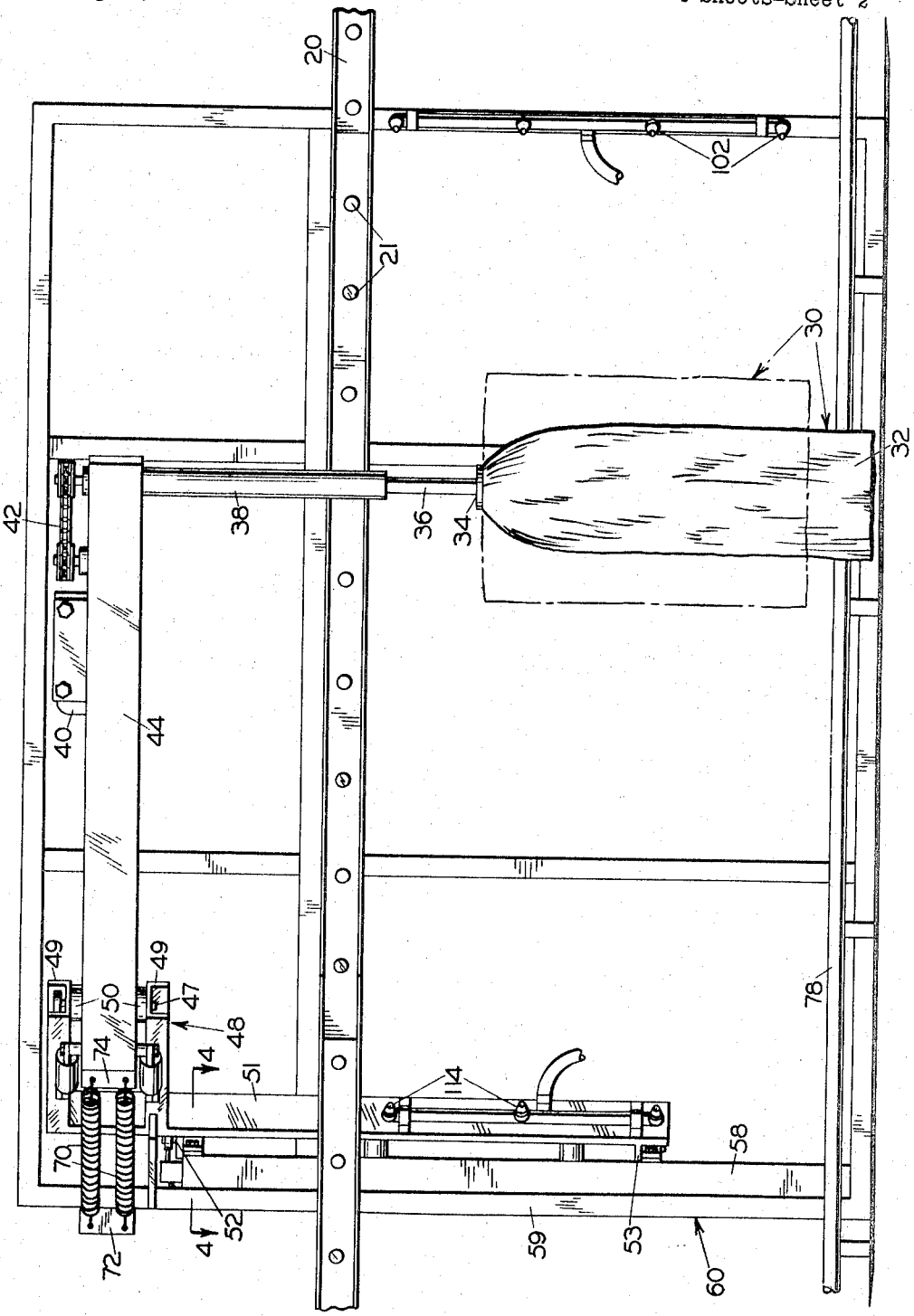

Nov. 7, 1967     D. C. HANNA     3,350,733
CAR WASHING DEVICES
Filed Aug. 5, 1966     4 Sheets-Sheet 3
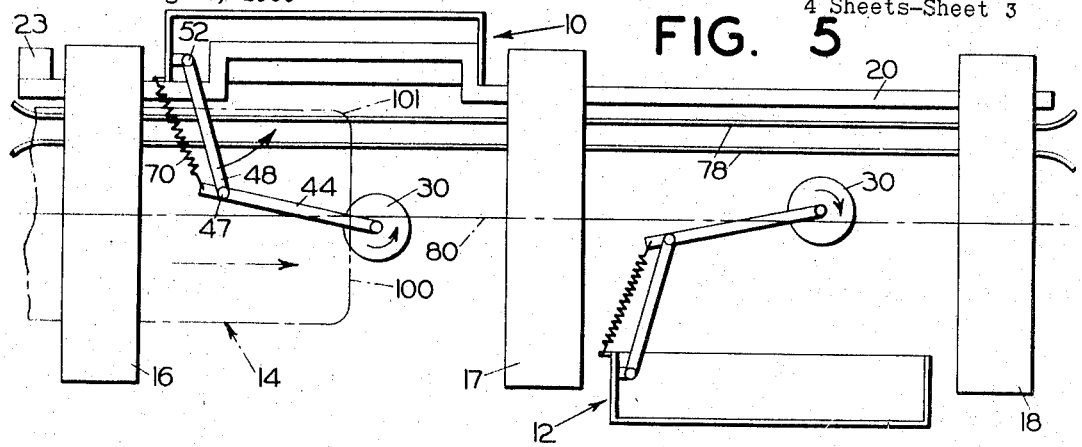
FIG. 5
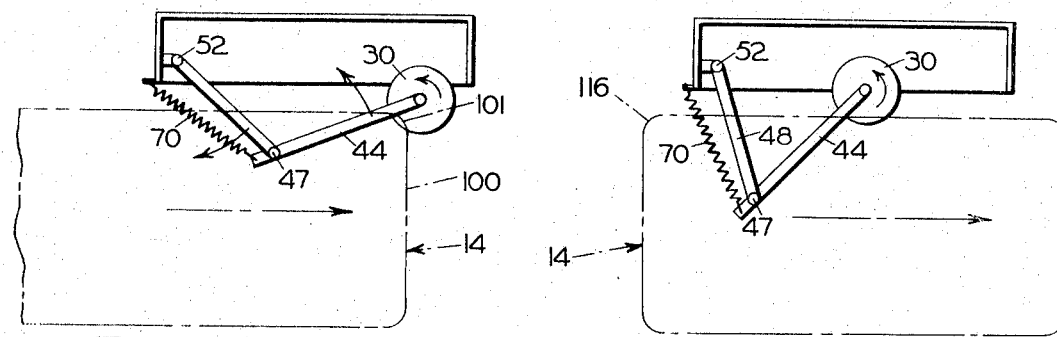
FIG. 6     FIG. 7
FIG. 8
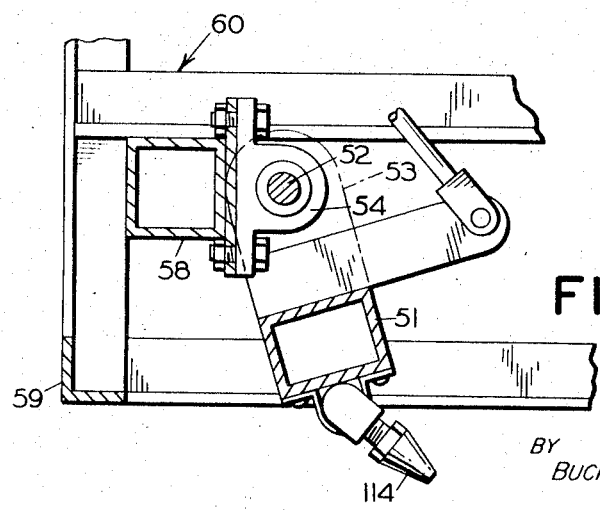
FIG. 4
DANIEL C. HANNA
INVENTOR
BY
BUCKHORN, BLORE, KLARQUIST & SPARKMAN
ATTORNEYS

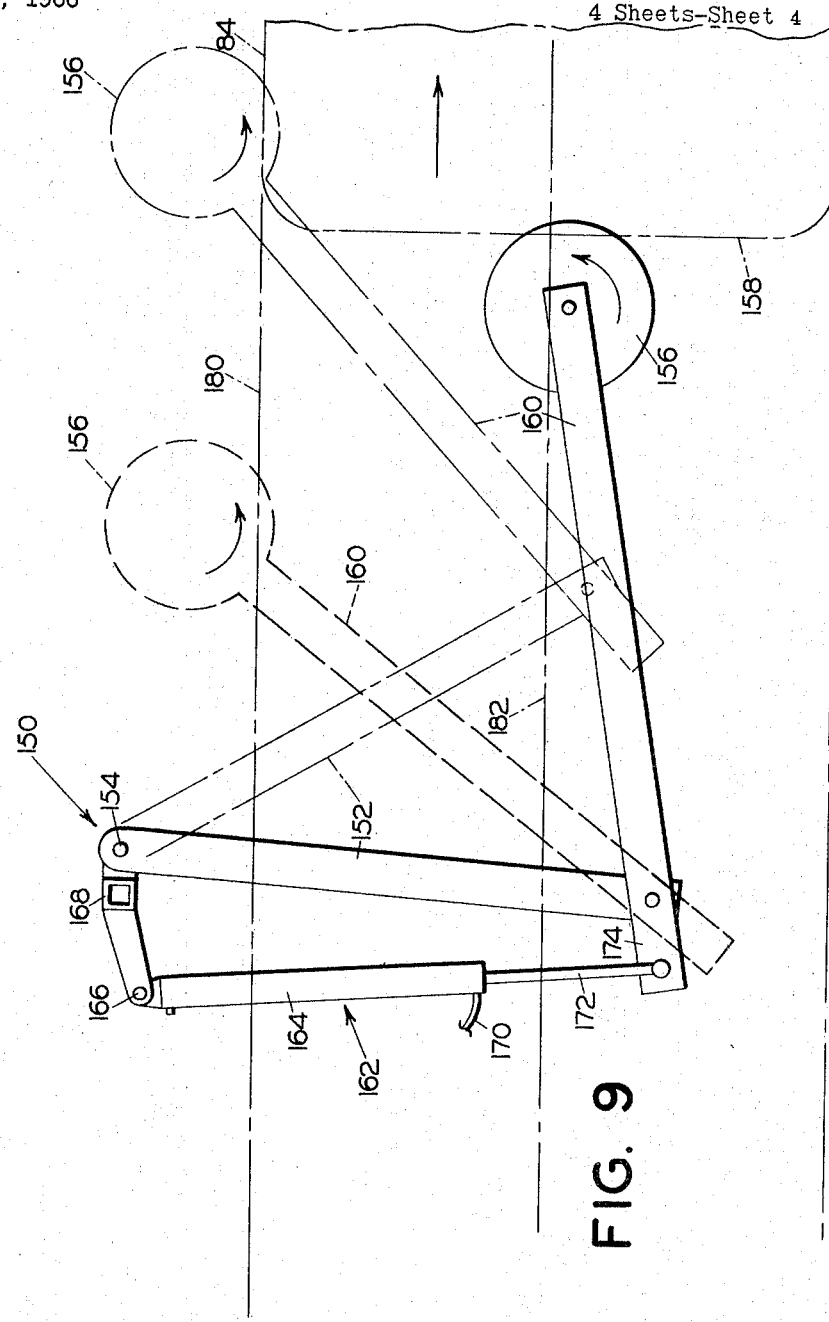

United States Patent Office 3,350,733
Patented Nov. 7, 1967

3,350,733
CAR WASHING DEVICES
Daniel C. Hanna, 2020 SE. 82nd Ave.,
Portland, Oreg. 97215
Filed Aug. 5, 1966, Ser. No. 570,491
23 Claims. (Cl. 15—21)

ABSTRACT OF THE DISCLOSURE

A first overhead arm 48 pivotal at one side of a car washing arch between a normal position extending transversely over the path of a car and a second position extending forwardly along the path carries a second, overhead, brush-mounting arm 44 pivotally between a normal position extending forwardly over the path and a folded position folded back on the first overhead arm. A single spring 70 between the brush-mounting arm and the arch urges both arms toward their normal positions. The brush-mounting arm carries a motor drive and a rotary brush. When a car is driven along the path, it engages the brush and moves the brush forwardly. This swings the arms as a unit to move the brush forwardly and to one side of the car. As the brush clears the front corner of the car, its rotation is such that reaction of the car on the brush folds the brush-mounting arm back on the first overhead arm and moves the first overhead arm back to its normal position. Then as the rear corner of the car moves past the brush, the spring swings the brush-mounting arm and the brush forwardly and across the car to scrub the back end of the car.

This invention relates to car washing devices, and more particularly to devices for scrubbing the fronts, sides and backs of cars.

In car washing apparatus known hitherto of the type wherein the car is advanced continuously through the apparatus, it has been necessay to provide a plurality of rotary brushes for each side of the car inasmuch as the brushes must be moved with the car to scrub the front and back ends of the car, and complex controls have been necessitated. As a result, such apparatus has been expensive to construct, operate and maintain. It would be desirable to provide a simple, inexpensive, highly effective device for automatically scrubbing the front, sides and rear of a car with only one brush for each side of the car.

An object of the invention is to provide new and improved car washing devices.

Another object of the invention is to provide new and improved devices for scrubbing the fronts, sides and backs of cars.

A further object of the invention is to provide a car washing device in which a brush is mounted to automatically move with and across the front end of an automobile moved along a path, move along the side of the automobile, and then move with and across the back of the automobile.

Another object of the invention is to provide a car brushing device in which a brush is mounted overhead in the path of an automobile by a pair of hinged, overhead arms, is moved by the automobile forwardly and across the front end of the automobile to a side of the automobile, is then held against the side of the automobile as the automobile moves therepast and then is swung forwardly with the automobile and across the rear end of the automobile, the brush preferably being rotated in a direction tending to move itself around the front, side and rear of the automobile.

The invention provides car washing apparatus in which a brush is supported by mounting means in the path of a car and, as the front end of the car engages the brush and travels therepast, is guided by the mounting means forwardly and across the front end of the car to one side of the car, is held against that side of the car, and then is moved forwardly with the car and across the rear end of the car. Preferably the brush is rotated in a direction such as to tend to move itself, from the reaction force in brushing the car, across the front of the car to the side thereof, rearwardly along the car and across the rear end of the car. In a car washing device forming a specific embodiment of the invention, a brush is suspended rotatably on a vertical axis in the path of a car by an outer overhead arm which is pivotally mounted for movement in a horizontal plane on one end of an inner overhead arm which is pivotally mounted at its other end on a fixed vertical axis at one side of the path of the car. The arms are urged toward starting positions in which the inner arm extends across the path and the outer arm extends forwardly along the path from the outer end of the inner arm, and the inner arm is permitted to swing forwardly so that, as the front end of the car engages the brush and pushes it forwardly, the inner arm swings forwardly and toward one side of the path to move the brush across the car, as the brush clears the front corner of the car and the side of the car moves therepast, the inner arm is swung back to its starting position and the outer arm folds back on the inner arm, and as the rear corner clears the brush, the inner arm is swung forwardly and across the path to hold the brush against the rear end of the car. The brush is rotated in a direction tending to move itself, from reaction from brushing the car, in the path of the brush just described.

A complete understanding of the invention may be obtained from the following detailed description of car brushing devices forming specific embodiments thereof, when read in conjunction with the appended drawings, in which:

FIG. 1 is a top plan view of a car brushing device forming one embodiment of the invention;

FIG. 2 is a side elevation view of the car brushing device of FIG. 1;

FIG. 3 is an enlarged, vertical sectional view taken along line 3—3 of FIG. 3;

FIG. 4 is an enlarged, horizontal sectional view taken along line 4—4 of FIG. 2;

FIGS. 5 to 8 are schematic, top plan views of the car brushing device of FIG. 1 at several stages of operation thereof in brushing a car; and FIG. 9 is a top plan view of a car brushing device forming an alternate embodiment of the invention.

Referring now in detail to the drawings there is shown therein a car washing apparatus forming one embodiment of the invention and including car brushing mechanisms 10 and 12 (FIG. 1) for scrubbing the front, sides and rear of a car or automobile 14 as the car is moved at a substantially uniform speed along a guide track 15 from a soaping arch 16 through a top scrubbing arch 17 to a rinsing arch 18. The mechanism 10 serves to scrub the left half of the front end, the left side and the left half of the rear end of the car while the car is moved from the soaping arch to the top scrubbing arch 17, and the mechanism 12 serves to scrub the right half of the front, the right side and the right half of the rear of the car while the car is moved from the top scrubbing arch 17 to the rinsing arch 18. A light bar 20 having lamps 21 sequentially lighted by a timing control device 23 paces the car through the apparatus.

The car brushing mechanisms 10 and 12 are identical but handed or allochiral relative to each other, and only the mechanism 10 will be described in detail. The mechanism 10 includes a large diameter, rotary scrubbing brush 30 (FIGS. 2 and 3) having long bristles 32 and a small diameter core 34 rotated in a counterclockwise direction, as viewed in FIG. 1, by a shaft 36 journaled by rotary and thrust bearings in a vertical tube 38 (FIG. 2) and driven by an electric motor drive unit 40 through a chain and sprocket drive 42. The tube 38 is rigidly mounted on the outer end of a rigid, tubular outer arm 44, and the drive unit 42 is mounted on the arm 44 and is supplied with power by cabling 46 (FIG. 1) supported by the arm 44 and a rigid inner arm 48 made of a pair of spaced channels 49 rigidly secured together by vertical members 51. The inner end of the outer arm 44 is mounted pivotally on a vertical axis at the outer end of the inner arm 48 by a radial and thrust bearing structure 50 and a shaft or pin 47. A vertical pin or shaft 52 (FIGS. 2 and 4) fixed rigidly to brackets 53 on the elongated member 51 to the inner end of the arm 48 is journaled in radial and thrust bearings 54 carried by a post 58 fixed to a rigid end frame 59 of a paneled box 60. The end frame 60 is anchored to the floor and supports a jogged portion of the light bar 20. The paneled box is open at the side thereof adjacent the path of the car.

A pair of elongated tension springs 70 (FIGS. 1 and 3) secured to ears 72 and 74 on the end frame 59 and the inner end of the arm or lever 44, respectively, urge the arm 44 and the arm 48 to the normal or starting positions thereof shown in full lines in FIG. 1 and FIGS. 2 and 5. In the normal or starting positions, the arm 48 extends primarily transversely of the path of the car 14 which is guided by a track 78 for its left wheels and the arm 44 extends primarily forwardly along the path to position the brush 30 beyond centerline 80 of the path of the largest car or automobile 14 to be washed. In these starting positions, the arm 44 is held by the springs 70 against a rubber pad or stop 82 (FIG. 1) carried by a vertical member 84 of the arm 48 and the arm 48 is held against a rubber pad or stop 86 carried by a plate 88 rigidly mounted on the frame of the box 60. Fluid pressure damping cylinder units or shock absorbers 90 and 92 are mounted respectively between the end frame 59 and the arm 48 and between the arms 44 and 48.

As the car 14 approaches the brush 30, the timing control 23 starts the motor unit 40 to rotate the brush in a clockwise direction for a period of time sufficient for the car to move to and entirely past the brush. As the front end 100 of the car moves into engagement with the brush, the car pushes the brush forwardly and swings the arms 44 and 48 as a unit about the pin 52 to the positions thereof of FIG. 6 in which the brush is clearing the lefthand front corner of the car, the movement of the brush being forwardly with the car and laterally across the front end of the car. The brush scrubs the front end of the car, hot, soapy water being supplied to the brush by nozzles 102 (FIG. 1) mounted on the box 60, the water passing through a solenoid operated valve (not shown) opened by a switch 104 actuated by a cam 106 on the shaft 52, whenever the arm 48 is away from its starting position. The brush engages the front end of the car slightly chordally and the resistance of the car to rotation of the brush tends to move the brush across the front end of the car in an upward direction, as viewed in FIG. 5, which is the desired movement for the brush to clear the front end of the car.

After the brush 30 is moved around the lefthand front corner of the car 14 as illustrated in FIG. 6, the car moves on forwardly and the brush scrubs the side of the car. The effective length of the lever arm between the pin 47 and the adjacent end of the spring 70 is much less than the distance of the spring 70 to the pin 52 so that the arm 48 is moved back to its starting position fairly soon after the lefthand front corner 101 of the car clears the brush and the arm 44 swings clockwise relative to the arm 48 to a cocked or folded position thereof shown in FIG. 7, the resistance of the side of the car to rotation of the brush tending to move the brush rearwardly along the car to aid in the folding of the arm 44 back on the arm 48 and in moving the arm 48 back to its starting position. When the arm 44 first starts to fold relative to the arm 48, a cam 110 (FIG. 1) on the shaft 47 actuates a switch 112 on the arm 48 to open a solenoid operated valve (not shown) to supply hot soapy water under pressure to nozzles 114 mounted on the member 51, and the nozzles direct the water onto the brush 30 and the lefthand side and back end of the car and continue until the arm 44 is later returned to its starting position.

The lefthand side of the car is scrubbed thoroughly by brush as the car is advanced past the brush, the arm 44 being in its folded or retracted position doubled back on the arm 48 until the lefthand rear corner 116 arrives at the brush. Then the springs 70 swing the arm clockwise, as viewed in FIG. 7, back toward the starting position to hold the brush 30 against the rear end of the car and move the brush forwardly and across the rear end of the car to scrub somewhat over one-half the width of the rear end of the car. The direction of rotation of the brush aids in moving the brush around the lefthand rear corner 116 and across the lefthand portion of the rear end of the car. Since the arm 44 is long and swings from a position extending a large extent transversely of the path of the car, the path of the brush has a large component in the direction of travel of the car. This, plus the speed at which the car is paced by the light bar 20, causes the brush to contact and effectively scrub the rear end of the car until the brush reaches its starting position at the far side of the centerline 80 of the path. The other half of the car is similarly scrubbed by the device 12 (FIG. 1).

A car washing apparatus 150 (FIG. 9) forming an alternate embodiment of the invention includes an inner overhead arm 152 mounted for swinging movement on a fixed vertical pivot 154 from a starting position shown in full lines to an extended position shown in broken lines in which a brush 156 clears the lefthand front corner of a car 158. An outer arm 160 carries the brush and is movable between a normal extended position relative to the arm 152 and shown in full and broken lines and a folded position relative to the arm 152 and shown in dash lines. An elongated single action pneumatic cylinder unit 162 includes a cylinder 164 mounted pivotally on a fixed vertical pin 166 carried by a post 168 in a fixed position spaced from the pivot pin 154. Air under pressure supplied to the cylinder 164 through conduit 170 urges a piston 172 toward a contracted position. The piston 172 is connected to a short lever arm 174 rigid with the arm 160. Suitable cushioned stops (not shown) are provided to limit clockwise movements of the arms 152 and 160 to the starting positions thereof shown in full lines. A flow control valve 176 at the inner end of the cylinder connects that end to the atmosphere and damps movement of the piston in the cylinder.

The arm 152 extends from the pin 154, which is spaced from a side 180 of the path of the car 158, to a point substantially beyond centerline 182 of the path of the car when the arm 152 is in its starting position. The arm 160 is sufficiently long as to support the brush at lefthand side 184 of the car when the arm 152 is in its starting position and the arm 160 is in its folded position. This gives the brush a greater forward component along the path of the car when the side of the car has cleared the brush and the brush is scrubbing the rear end of the car and is returning to its starting position. The brush is driven by an electric motor unit (not shown) like the electric motor unit 40 (FIG. 1). A similar but handed brushing device (not shown) is provided for scrubbing the righthand side, front and rear of the car. Suitable nozzles (not shown) like the nozzles 102 and 114 and controls for the nozzles are provided for supplying heavy stream of hot soapy water to the car and the brush 156 during the brushing operation.

In the operation of the car washing apparatus of FIG. 9, the car 158 is advanced continuously from left to right, as viewed in FIG. 9, along the path 180. As the car approaches the brush 156, a timer control (not shown) starts the drive (not shown) to rotate the brush counter-clockwise, the arms 152 and 160 being held in their full line positions to position the center of the brush below the centerline 182. The front end of the car engages the brush and moves the brush forwardly with the car. This swings the arms 152 counter-clockwise as a unit, against the urging of the cylinder unit 162, until the brush 156 clears the lefthand front corner of the car. Then the arm 152 is swung back to the starting position thereof and the arm 160 is folded back on the arm 152 to its position shown in dash lines while scrubbing the forward portion of the lefthand side 184 of the car. The car continues to move forwardly and the brush 156 is urged continuously into engagement with the side of the car and scrubs the side of the car. When the left rear corner of the car clears the brush, the cylinder unit 162 swings the arm clockwise to maintain the brush in scrubbing engagement with the rear end of the car and the brush is moved back to its starting position ready for the next car which may be only a few feet behind the car just scrubbed.

The above-described car washing devices serve to effectively brush the front end, rear end and side of the car, only one brush for each half of the car being required. Also, each brush has a natural movement across the front, along the side and across the rear of the car to maintain contact with the car, and the directions of rotation of the righthand and lefthand brushes are such as to aid in the proaches the brush 156, a timer control (not shown) starts movement of the brushes around the car. The mounting structures mounting the brushes for movement around the car operate entirely without any driving devices other than the biasing devices described above.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In an apparatus for washing cars,
  a rotary brush,
  means for rotating the brush,
  overhead mounting means mounting the brush for holding the brush against a front end of a car advanced forwardly along a predetermined path, permitting movement of the brush forwardly with the car and transversely of the car to a side of the car while in engagement with the front end of the car, holding the brush in engagement with said side of the car, moving the brush from said side of the car into engagement with the rear end of the car and moving the brush forwardly with the car and transversely of the rear end of the car,
  the overhead mounting means including an inner arm pivotally mounted at an end thereof at one side of said path for movement of the other end of the arm from a first position over the central portion of said path laterally and forwardly of said path to a second position more adjacent said side of said path,
  the overhead mounting means also including an outer arm pivotally mounted on said other end of the inner arm for movement between a normal position extending substantially transversely of the inner arm and forwardly of said path and a folded position extending back along the inner arm and crosswise of said path,
  means mounting the brush on the forward end of the outer arm,
  and means urging the outer arm toward its normal position and the inner arm toward said first position thereof.

2. In an apparatus for washing cars,
  a rotary brush,
  means for rotating the brush,
  an inner arm pivoted at one end about a fixed axis and having a free end,
  an outer arm pivotally mounted at one end thereof on the free end of the inner arm, and having a free end,
  means suspending the rotary brush from the free end of the outer arm,
  and means normally holding the inner arm in a normal position above and extending primarily transversely of a path of an automobile moved forwardly along said path and the outer arm in a normal position above and extending primarily along said path and permitting the inner arm to swing forwardly relative to said path from its normal position and the outer arm to move between its normal position and a folded position extending back along the inner arm and primarily transversely of said path.

3. In combination,
  support means positioned at one side of a path of a car advanced forwardly along said path,
  an inner arm mounted pivotally on the support means above said path for movement between a normal position extending primarily transversely of said path substantially to the centerline of said path and a forward position extending more forwardly relative to said path than when in the normal position thereof,
  an outer arm mounted pivotally on the inner arm above said path for movement between a normal position extending predominantly transversely to the inner arm and forwardly relative to said path and a folded position extending back along the inner arm,
  a rotary brush carried by the outer arm for sequentially engaging the front end, side and rear end of the car as the car is advanced along said path,
  drive means for rotating the brush,
  and positioning means urging the arms toward the normal positions thereof.

4. The combination of claim 3 wherein the positioning means comprises a cylinder device connected to the outer arm and the support means, and means supplying fluid pressure to the cylinder device to urge the arms toward their normal positions.

5. The combination of claim 3 wherein the positioning means comprises a tension spring connected to the support means and the outer arm.

6. The combination of claim 3 wherein the drive means rotates the brush in a direction in which the reaction of the car on the brush tends to move the brush first across the front end to said side of the car, then back along said side of the car and then across the rear end of the car from said side thereof.

7. The combination of claim 6 wherein the brush is urged against the side of the car with sufficient force and is rotated with sufficient force to move the inner arm to its normal position and the outer arm to its folded position while the brush is in engagement with said side of the car.

8. The combination of claim 3 and including means for supplying the brush with a cleaning liquid.

9. The combination of claim 3 including first spray means operable to spray a cleaning liquid on the brush when the inner arm is away from its normal position and second spray means operable to spray cleaning liquid on the brush when the outer arm is away from its normal position.

10. The combination of claim 3 wherein the drive means comprises an electric motor unit mounted on one of the arms, and means drivingly coupling the motor unit and the brush.

11. The combination of claim 3 wherein the support means comprises a post fixedly positioned at said side of said path.

12. The combination of claim 11 including a box-like structure positioned at said side of said path and open at said side for reception of the brush.

13. In an apparatus for washing cars,
a rotary brush,
an overhead, horizontal, inner arm pivoted at one end for pivotal movement about a vertical axis located at one side of a path of a car moved forwardly along said path,
an overhead, horizontal, outer arm pivotally mounted at one end thereof on the other end of the inner arm,
a shaft carrying the brush,
elongated bearing means carried by the free end of the outer arm and journaling the shaft in a vertical position extending downwardly from the outer arm to position the brush in said path of the car,
and means normally holding the inner arm in a normal position extending primarily transversely of said path and the outer arm in a normal position extending primarily along said path and permitting the inner arm to swing forwardly from its normal position and the outer arm to move between its normal position and a folded position extending back along the inner arm and primarily transversely of said path.

14. In an apparatus for washing cars,
an arm having a pivot end and a free end,
a brush,
mounting means mounting the pivot end of the arm pivotally on a substantially vertical axis and the arm substantially horizontally over a path of a car advanced in a forward direction along the path for swinging movement of the free end of the arm from a normal position extending forwardly along the path from the pivot end of the arm to a second position in which the arm extends transversely of the path and the free end of the arm is at one side of the path,
means suspending the brush from the free end of the arm into the path of the car,
means supporting the mounting means for movement forwardly along the path of the car from a normal position to a forward position to permit movement of the brush with the car and across the car to said second position when the brush is pushed forwardly with the car,
and means for moving the mounting means and the arm sequentially to the normal positions thereof to maintain the brush in contact with the rear end of the car after the rear corner of the car clears the brush.

15. In an apparatus for washing cars movable along a predetermined path of a predetermined maximum height,
a first pivotal arm normally held in a first position outside said path of a car and extending at least partially across said path and movable forwardly with the car to a second position extending forwardly along said path,
a second arm outside said path and pivotal on the first pivotal arm between a first position extending laterally away from the first pivotal arm in the direction of movement of the car and a folded position extending back along the first arm,
a rotary brush,
means mounting the rotary brush on the second pivotal arm in the path of the car,
and means for first moving the second pivotal arm to the second position thereof while the brush is in engagement with a side of the car and the first pivotal arm is in the first position thereof and then moving the second pivotal arm to the first position thereof after the side of the car has cleared the brush to hold the brush in engagement with the rear end of the car and move the brush across the rear end of the car as the car is moved along said path.

16. In a car washing apparatus,
a rotary brush adapted to be positioned in the path of a car for tangential contact by the car and adapted to be moved sequentially forwardly with and across the front of the car to a lateral portion of the car, rearwardly along the lateral portion of the car and forwardly with and across the rear of the car,
an overhead pivotal arm carrying the brush,
movable carrier means mounting the arm pivotally above the path of the car so that the arm clears the car and movable transversely of the path to position the arm in an intermediate start position, an extreme forward position as the brush clears a front corner of the car and an extreme rearward position as the brush clears a rear corner of the car,
and drive means for moving the carrier means and the arm to move the arm sequentially across the front end of the car from its intermediate start position to its extreme forward position, rearwardly along the side of the car from its extreme forward position to its extreme rearward position, and from its extreme rearward position to its intermediate start position.

17. The car washing apparatus of claim 16 wherein the drive means comprises urging means operable on the carrier means and the arm to urge the arm toward its intermediate start position and means for rotating the brush in a direction such that reaction of the car on the brush tends to move the arm sequentially from its intermediate start position to its extreme forward position, from its extreme forward position to its extreme rearward position and from its extreme rearward position to its intermediate start position.

18. In a car washing apparatus,
a first arm mounted pivotally at an axis outside of and adjacent a predetermined path of a car moved along the path in a predetermined direction,
a second arm mounted at one end thereof pivotally on the first arm,
a brush carried by the other end of the second arm,
means for initially locating the arms in positions in which one arm extends primarly transversely of the path and the other arm extends primarily along the path and permitting swinging movement of the arms and the brush as a unit to move the brush forwardly with the car and across the front of the car to a lateral portion of the car as the front of the car engages the brush and pushes it,
means for rotating the brush in a direction such as to, while the lateral portion of the car moves along the brush, fold the arms and move the brush rearwardly along the path while maintaining contact between the brush and the lateral portion of the car,
and means operable after the lateral portion of the car is moved past the brush for swinging the second arm forwardly and across the rear of the car to maintain contact between the brush and the car and brush the rear of the car.

19. In a car washing apparatus,
an arm,
a rotary brush carried by one end of the arm,
carrier means connected to the other end of the arm and supporting the arm pivotally about a predetermined portion thereof,
means mounting the carrier means for movement relative to a predetermined path of a car moved therealong in a predetermined direction in which movement the brush is engaged by the front of the car and is first moved forwardly with the car and to one side of the car while the arm extends primarily forwardly from the carrier means, the brush is then moved rearwardly along said side of the car and simultaneously therewith the arm is moved to a rearward position and then the arm is swung forwardly and across the path to hold the brush in engagement with the rear of the car and is moved across the rear of the car, means for rotating the brush in a direction in which the brush tends to move the arm across the front of the car to said side of the car when engaging the front of the car, tends to move the arm rearwardly along said side of the car while engaging said side of the car and tends to move the arm from said side along the rear of the car after said side of the car clears the brush, and means tending to hold the brush in engagement with the car.

20. In a car washing apparatus, foldable arm means movable between a folded condition and an extended condition, a rotary brush carried at one end of the arm means for tangentially engaging a car, means mounting the other end of the arm means for pivotal movement of the arm means about an axis at the side of a predetermined path of the car as the car is moved along the path in a predetermined direction to position the brush in the path of the car and permitting a predetermined swinging movement of the arm means to sequentially move the brush with and across the front of the car to one side of the car, fold the arm means to its folded condition while the brush is at the side of the car and extend the arm means to move the brush forwardly with and across the rear of the car, urging means tending to extend the arm means and hold the brush against the car, and means for rotating the brush in a direction in which the reaction of the brush from engaging the side of the car moves the brush back along the side of the car and folds the arm means against the action of the urging means.

21. In a car washing apparatus, carrier means movable along a path along which a car is moved in a predetermined direction and also movable simultaneously transversely of said path, a rotary brush for tangentially contacting the car, an arm carrying the brush at one end portion and carried pivotally at the other end portion by the carrier means for movement between a forward position extending from the carrier means with the brush in a forward position in said path and a rear position of the arm in which the brush is positioned rearwardly of its forward position while the brush is at one side of the path, positioning means operable on the carrier means and the arm for first holding the arm in its forward position with the brush in the path of the car, then moving the arm to its rear position after the brush clears the front end of the car, and then moving the arm to its forward position after the brush clears the rear corner of the car to move the brush forwardly against and across the rear of the car, and means for rotating the brush in a direction in which reaction force of tangential contact with the car tends to move the brush first toward said side of the car while contacting the front of the car, then toward the rear position of the brush while the brush contacts a side of the car and then from said side of the car toward the other side thereof while the brush contacts the rear of the car.

22. In a car washing apparatus, support means positioned adjacent a path of a car moved along the path in a forward direction, an arm mounted pivotally on the support means between a normal position and a second position, a rotary brush, a carrier lever carrying the brush at one end and pivotally mounted at a point between the ends of the lever to the arm for movement relative to the arm between an extended position positioning the brush in the path and a folded position positioning the brush in engagement with a lateral portion of the car, biasing means connected between the support means and the other end of the lever and normally urging the lever toward its extended position and the arm toward its normal position, and means for rotating the brush in a direction such that, when the brush engages the lateral portion of the car, the reaction force of the car on the brush moves the lever to its folded position.

23. In a car washing apparatus, a first arm, a second arm pivoted near one end thereof on the first arm for movement between an extreme extended position relative to the first arm and a folded position extending back along the first arm, a rotary brush carried by the other end of the second arm, support means mounted adjacent a path of a car moved along the path in a predetermined direction and mounting the first arm pivotally between a first position in which the second arm positions the brush in the path and a second position in which the second arm positions the brush at one side of the path when the car engages and pushes the brush along the path, means for rotating the brush in a direction in which the reaction force of the car on the brush tends to first keep the arms extended and move the brush outside of the path, then tends to move the brush back along the path to fold the arms and then tends to move the brush across the rear of the car, and biasing means urging the second arm toward its extended position and the first arm toward its first position and permitting the reaction force of the car on the brush to fold the second arm back on the first arm after the brush has been moved out of the path of the car, the urging of the second arm from its folded position toward its extended position by the biasing means serving to maintain the brush in engagement with the rear of the car after the car has moved past the brush and the brush is moved across the rear of the car.

References Cited

UNITED STATES PATENTS

| 2,579,866 | 12/1951 | Rousseau | 15—21 |
| 3,271,803 | 9/1966 | Cirino et al. | 15—21 |
| 3,310,824 | 3/1967 | Beer | 15—21 |

FOREIGN PATENTS

| 1,154,728 | 9/1963 | Germany. |

CHARLES A. WILLMUTH, *Primary Examiner.*

E. L. ROBERTS, *Assistant Examiner.*

UNITED STATES PATENT OFFICE
CERTIFICATE OF CORRECTION

Patent No. 3,350,733                              November 7, 1967

Daniel C. Hanna

It is hereby certified that error appears in the above numbered patent requiring correction and that the said Letters Patent should read as corrected below.

Column 4, line 14, after "by" insert -- the --; line 74, for "stream" read -- streams --; column 5, line 32, strike out "proaches the brush 156, a timer control (not shown) starts".

Signed and sealed this 26th day of November 1968.

(SEAL)
Attest:

Edward M. Fletcher, Jr.

Attesting Officer

EDWARD J. BRENNER

Commissioner of Patents